United States Patent [19]

Ikoma et al.

[11] Patent Number: 5,663,007
[45] Date of Patent: Sep. 2, 1997

[54] SEALED STORAGE BATTERY AND METHOD FOR MANUFACTURING THE SAME

[75] Inventors: Munehisa Ikoma, Shiki-gun; Akinori Yokota, Moriguchi; Shinji Hamada, Hirakata; Hiromu Matsuda, Kawabe-gun; Kanji Takata, Neyagawa, all of Japan

[73] Assignee: Matsushita Electric Industrial Co., Ltd., Osaka, Japan

[21] Appl. No.: 491,650

[22] Filed: Jun. 19, 1995

Related U.S. Application Data

[63] Continuation-in-part of Ser. No. 290,167, Aug. 15, 1994, Pat. No. 5,510,203.

[30] Foreign Application Priority Data

Feb. 23, 1994 [JP] Japan .................................. 6-025460
Jul. 11, 1994 [JP] Japan .................................. 6-158597

[51] Int. Cl.[6] .................................................. H01M 2/02
[52] U.S. Cl. .............................. 429/53; 429/148; 429/151; 429/156; 429/163; 29/623.1
[58] Field of Search ............................ 429/53, 57, 149, 429/151, 153, 156, 157, 101, 167, 170, 171, 172, 175, 176, 177, 185, 84; 29/623.1, 623.2

[56] References Cited

U.S. PATENT DOCUMENTS

| | | |
|---|---|---|
| 3,767,468 | 10/1973 | Schusler . |
| 4,468,440 | 8/1984 | Evjen . |
| 4,719,159 | 1/1988 | Clark et al. .......................... 429/159 |
| 4,732,826 | 3/1988 | Hardigg .............................. 429/176 |
| 5,278,003 | 1/1994 | Francisco ............................ 429/175 |
| 5,281,492 | 1/1994 | Lin ..................................... 429/84 |
| 5,455,125 | 10/1995 | Matsumoto et al. .................. 429/101 |
| 5,510,203 | 4/1996 | Hamada et al. ..................... 429/53 |

FOREIGN PATENT DOCUMENTS

| | | |
|---|---|---|
| 2 153 338 | 5/1973 | France . |
| 3-291867 | 12/1991 | Japan . |
| 5-343105 | 12/1993 | Japan . |

*Primary Examiner*—M. Nuzzolillo
*Attorney, Agent, or Firm*—Panitch Schwarze Jacobs & Nadel, P.C.

[57] ABSTRACT

A sealed storage battery has a rectangular casing (3) and a lid (2) of synthetic resin, which are connected by welding so as to seal an opening of the rectangular casing (3), and protruded portion on the outer welded portion (5) is removed and smoothed so that air as a cooling module is smoothly flown in spaces formed by ribs (4) on the battery casing (3) and the lid (2).

8 Claims, 8 Drawing Sheets

FIG.4A
FIG.4B
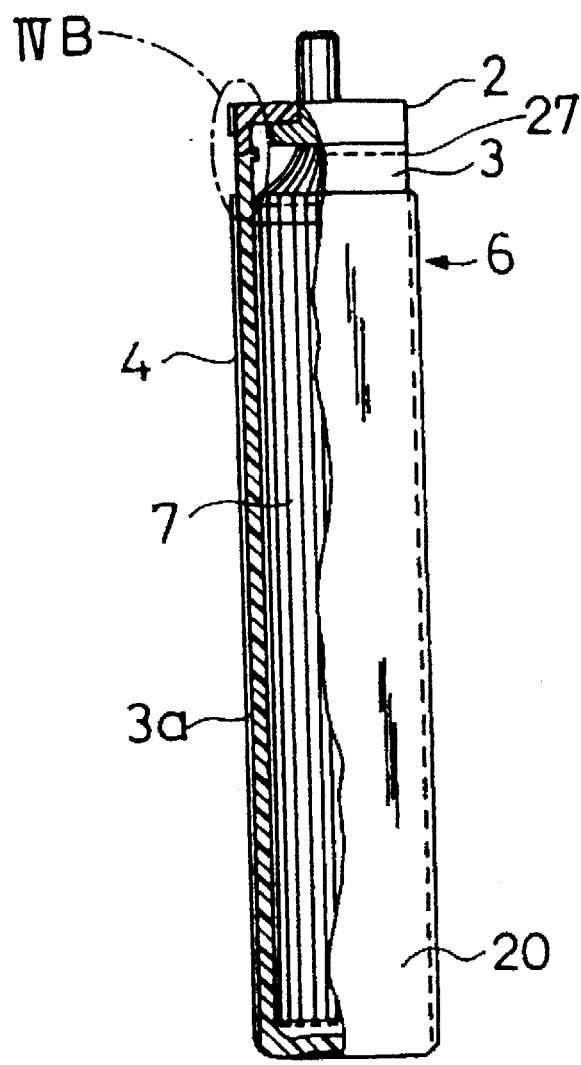
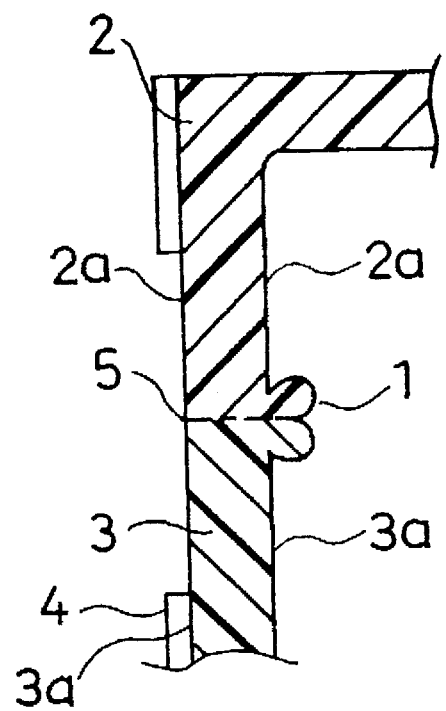

SEALED STORAGE BATTERY AND METHOD FOR MANUFACTURING THE SAME

Cross-Reference to Related Application

This is a continuation-in-part of U.S. application Ser. No. 08/290,167, filed Aug. 15, 1994, now U.S. Pat. No. 5,510,203.

FIELD OF THE INVENTION AND RELATED ART STATEMENT

1. Field of the Invention

The present invention relates to a sealed storage battery of a comparatively large capacity, which has a synthetic resin casing of a rectangular shape.

2. Description of the Related Art

Sealed storage batteries, which typically include lead storage batteries, nickel-cadmium storage batteries and hydrogen storage batteries, are widely used as power supply sources for portable apparatus, such as video cameras, lap-top type computers and portable telephones because of their high energy density and reliability.

Each cell of these sealed storage batteries for the above-mentioned use has a metal or synthetic resin casing of a cylindrical or rectangular shape. The cell is a small-sized sealed storage battery of which capacity is about 0.5 Ah to 3.0 Ah. In practical applications, several to several tens of the cells are usually accommodated in a synthetic resin casing or tube.

Since these small-sized sealed storage batteries have a battery capacity range as small as about 0.5 Ah to 3.0 Ah, only a small a amount of heat per a cell is generated during a charging or discharging period. As a result, when they are used in a synthetic resin casing or a tube, an appropriate balance or equilibrium is maintained between heat generation and heat discharge. Therefore, there has been no significant problem in the small-sized sealed storage batteries with regard to a temperature increase of the battery, and no special configuration has been necessary for the casing.

However, recently there arises strong demands for medium and large-sized batteries of high energy density and reliability as mobile power sources for various applications, such as home-use appliances and electric vehicles. The medium-sized battery is defined as that having a capacity of from 10 Ah to 100 Ah, the large-sized battery as that having a capacity of 100 Ah or more, and the number of cells used in the battery ranges from several to several hundreds depending on types.

For a battery as a mobile power source for various uses, such as home-use appliances and electric vehicles, it is necessary to be maintenance-free or to have sealed configuration.

A battery generates reaction heat and Joule's heat due to electrode reaction during the charging and discharging period. The increased capacity in sealed configuration of a battery causes increase of the amount of generated heat. As a result, heat dissipation to the outside of the battery is retarded, and hence the generated heat is accumulated within the battery. Consequently, the internal temperature of such battery is higher than that of a small-sized battery. In a module battery including a series connection of such large capacity cells, or a battery unit including a series connection of module batteries, several tens to several hundreds of cells are arranged in a contiguous manner. Therefore, the retardation of heat dissipation is further enhanced so that the temperature in the battery is further raised.

In order to solve such problems, Japanese Laid-Open Patent Publication No. Hei 3-291867 proposes a heat dissipation apparatus for a storage battery system, which has a large number of cells each consisting of positive and negative electrodes and an electrolyte, and generating heat during a charging and discharging period. In the above-mentioned storage battery system, a space for allowing air to flow is formed between the cells, and a ratio of space width to cell width is set to a range of 0.1 to 1.0.

Another, Japanese Laid-Open Patent Publication No. Hei 5-343105 proposes a module battery, which comprises plural cells and spacers disposed between the cells for forming through-holes formed along a vertical direction for allowing a temperature control medium.

In the above-mentioned conventional sealed storage batteries, a connected portion between a casing and a lid is very important for keeping perfect sealing and reliable condition of the storage battery. In a cylindrical-type storage battery used at present, a metal casing is sealed by crimping the metal casing and a lid having a safety vent. In a conventional small-sized rectangular-type storage battery a metal casing is sealed by using a laser welder in a manner to connect the metal casing to a lid having a safety vent, or by crimping as the sealing method used in the above-mentioned cylindrical-type storage battery. In a lead storage battery for starting an engine of a vehicle, a synthetic resin casing is sealed by thermally welding between the synthetic resin casing and a lid.

When the above-mentioned conventional storage battery sealed by the synthetic resin casing and the lid welded thereto is used for the portable power source battery for various uses, e.g., for home-use appliances and electric vehicles, it is important and necessary matter to efficiently radiate the heat generated within the sealed storage battery. Such heat dissipation can be made by passing a cooling medium into spaces between cells or module batteries configured by combining plural cells.

When a synthetic resin casing and a lid are connected by the same conventional welding system as the welding system for the lead storage battery for starting an engine of a vehicle, the conventional welding system has the following problems:

In the conventional welding system for connecting the synthetic resin lid to the casing, a protruded portion is generated at the connecting portion in the welding regions of them. The protruded portion has a height or a thickness of about 1 mm to 3 mm from an outer surface therearound of the synthetic resin casing. In order to supply air as cooling medium to and through spaces between the cells from an upper side or a lower side of the cells, as big spaces as possible for allowing air to flow between the cells should be arranged overcoming protruded height of the protruded portion in the welding regions. As a result of the arrangement of the big space for allowing air to flow, the conventional battery having the cells must be configured to have a large overall size. Thereby, energy density per unit volume of the battery becomes low.

OBJECT AND SUMMARY OF THE INVENTION

An object of the present invention is to solve the above-mentioned problems and provide a sealed storage battery in which a cooling medium can efficiently pass through gaps between the cells without deteriorating a mechanical strength and an air-tightness of a welded portion between a synthetic resin casing and a lid, and without decreasing energy density of the sealed storage battery.

And further, the sealed storage battery of the present invention can efficiently radiate the heat generated in the battery during a charging and discharging period, thereby leading to a superior constant battery performance with a high degree of reliability.

In order to achieve the above-mentioned object, a sealed storage battery of the present invention comprises:

an electrode group having positive electrode plates and negative electrode plates, which are piled alternately with separators therebetween, an electrolyte, a casing having each-other opposing parallel faces, which is made of synthetic resin, and has the electrode group and the electrolyte, a lid with a safety vent, which is made of synthetic resin, and is sealingly fitted to an opening of the casing, and protruded portion, which is formed on outer welded portion between the casing and the lid to be orthogonal to the piled positive and negative electrode plates of the electrode group, and/or on an inner welded portion between the casing and the lid.

The sealed storage battery in accordance with the present invention can be made by a method for manufacturing the sealed storage battery, which comprises an electrode group having positive electrode plates and negative electrode plates piled alternately with separators therebetween a synthetic resin casing sealed by synthetic resin lid with a safety vent, comprises steps of:

heating welding margins of the casing and the lid;

pressing the welding regions of the casing and the lid to connect each other, and removing a protruded portion on the welding regions of an outer wall of the casing and the lid.

According to the present invention, an outer welded portion is formed to have a flat and smooth surface. Therefore, it is not necessary for the sealed storage battery of the present invention to provide an excessively large space between the cells for allowing air to flow so as to overcome the protrusion of the outer welded portion as of the conventional battery. The sealed storage battery of the present invention can effectively accomplish heat dissipation from the battery casing even with small gaps for air flow between the cells.

Since the battery casing and the lid are contacted at large bonding section in the welded portion, the battery casing and the lid are connected firmly. As a result, the welded portion of the battery casing and the lid is prevented from coming off even when the synthetic resin casing and lid expand and constricted owing to changes of inner pressure or/and temperature of the battery casing in repetitive charging and discharging operations.

As mentioned above, the sealed storage battery of the present invention is configured to have the high energy density per volume of the sealed storage battery, and can efficiently radiate the heat generated in the sealed storage battery during charging and discharging period. Thereby, a superior stable and constant battery performance is attained with a high degree of reliability.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 4A is a partially-cutaway side elevation view of the cell of FIG. 1, FIG. 4B is an enlarged sectional view of the cell of FIG. 4A.

It will be recognized that some or all of the Figures are schematic representations for purposes of illustration and do not necessarily depict the actual relative sizes or locations of the elements shown.

DESCRIPTION OF THE PREFERRED EMBODIMENT

Hereafter, a sealed storage battery of a preferred embodiment of the present invention will be described with reference to FIGS. 1 to 8.

Figure 1:
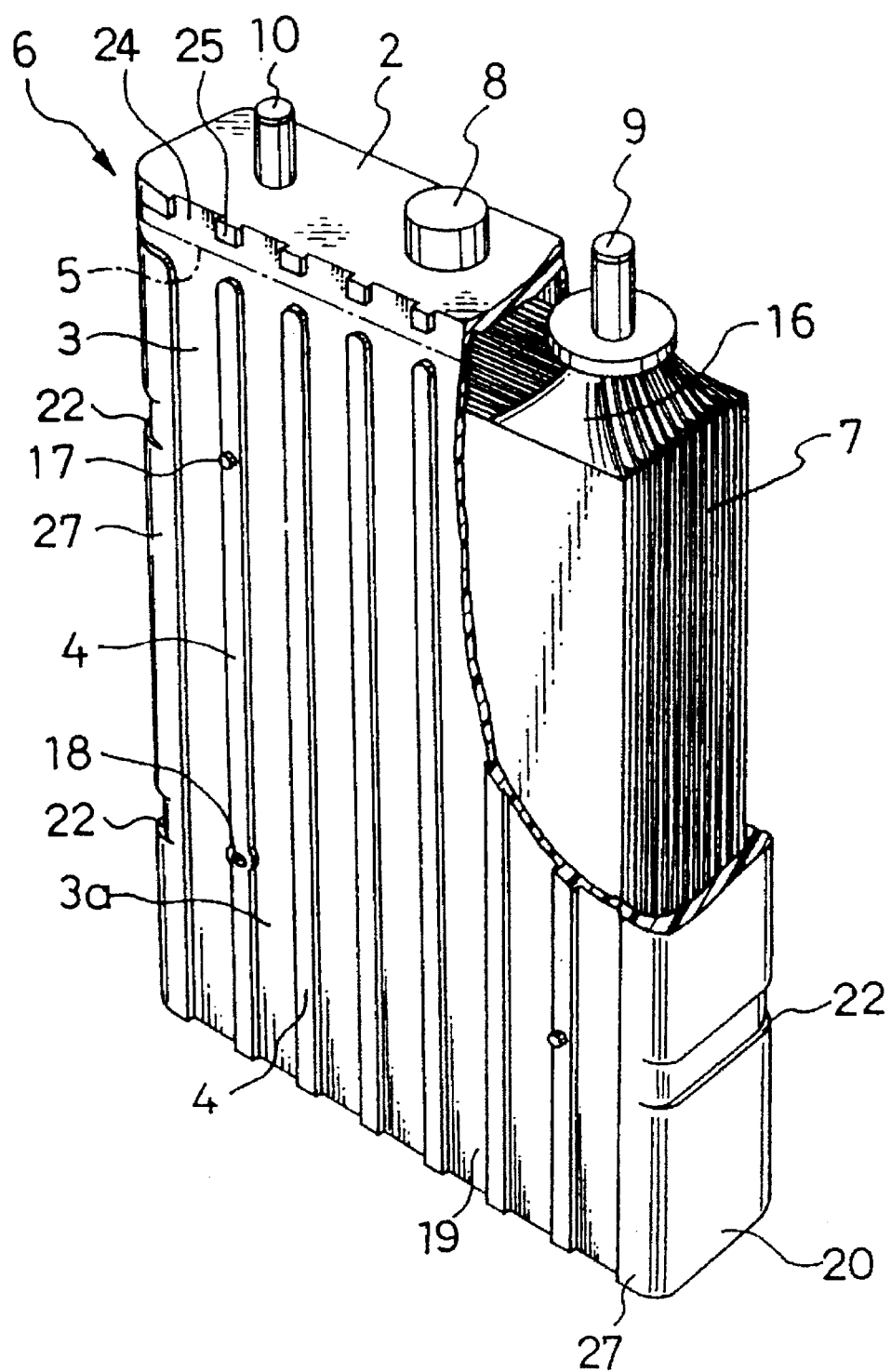
FIG. 1 is a partially-cutaway perspective view of a sealed storage battery in a preferred embodiment of the present invention.
Figure 2:
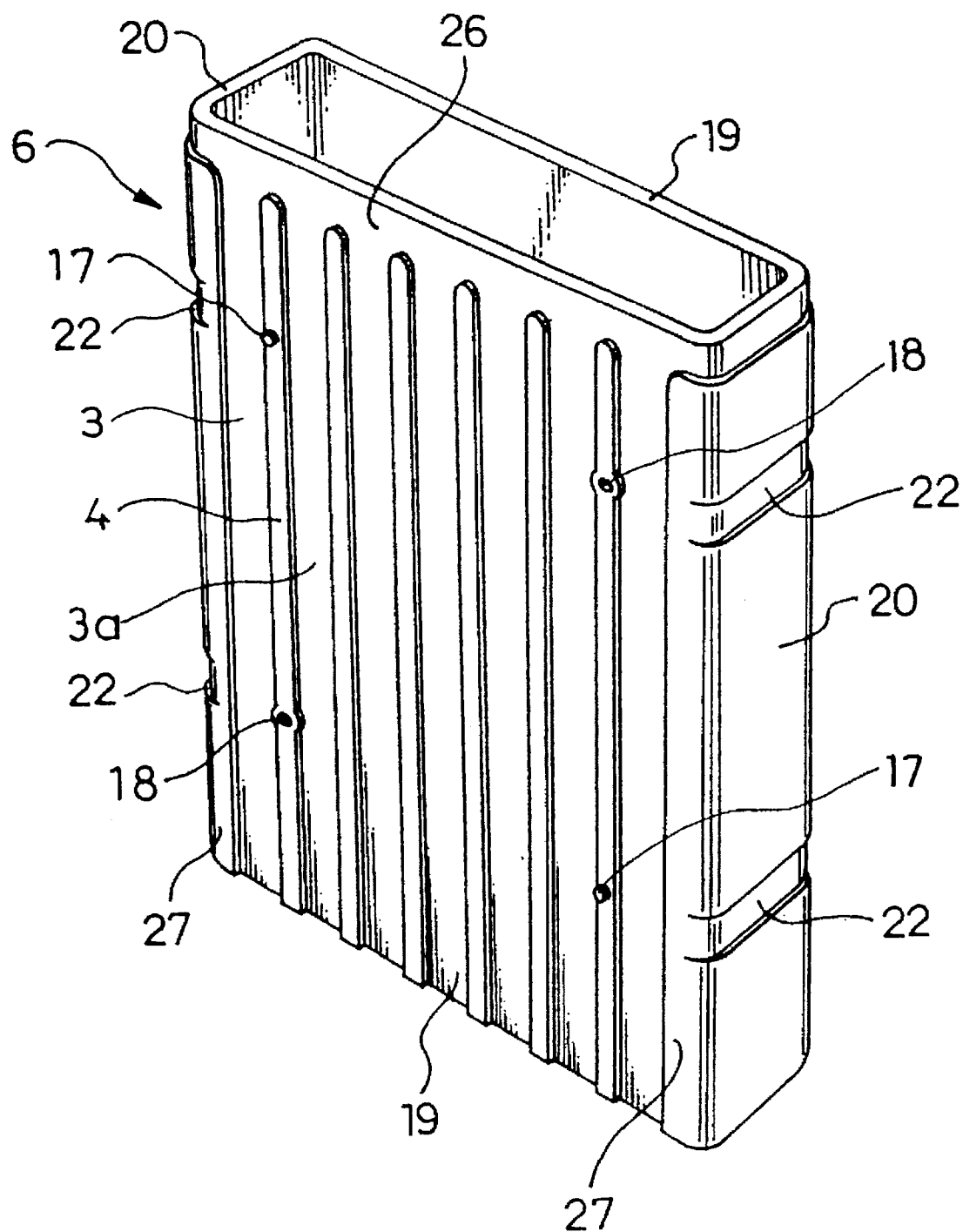
FIG. 2 is an upward perspective view showing a battery casing of the sealed storage battery of FIG. 1.
Figure 3:
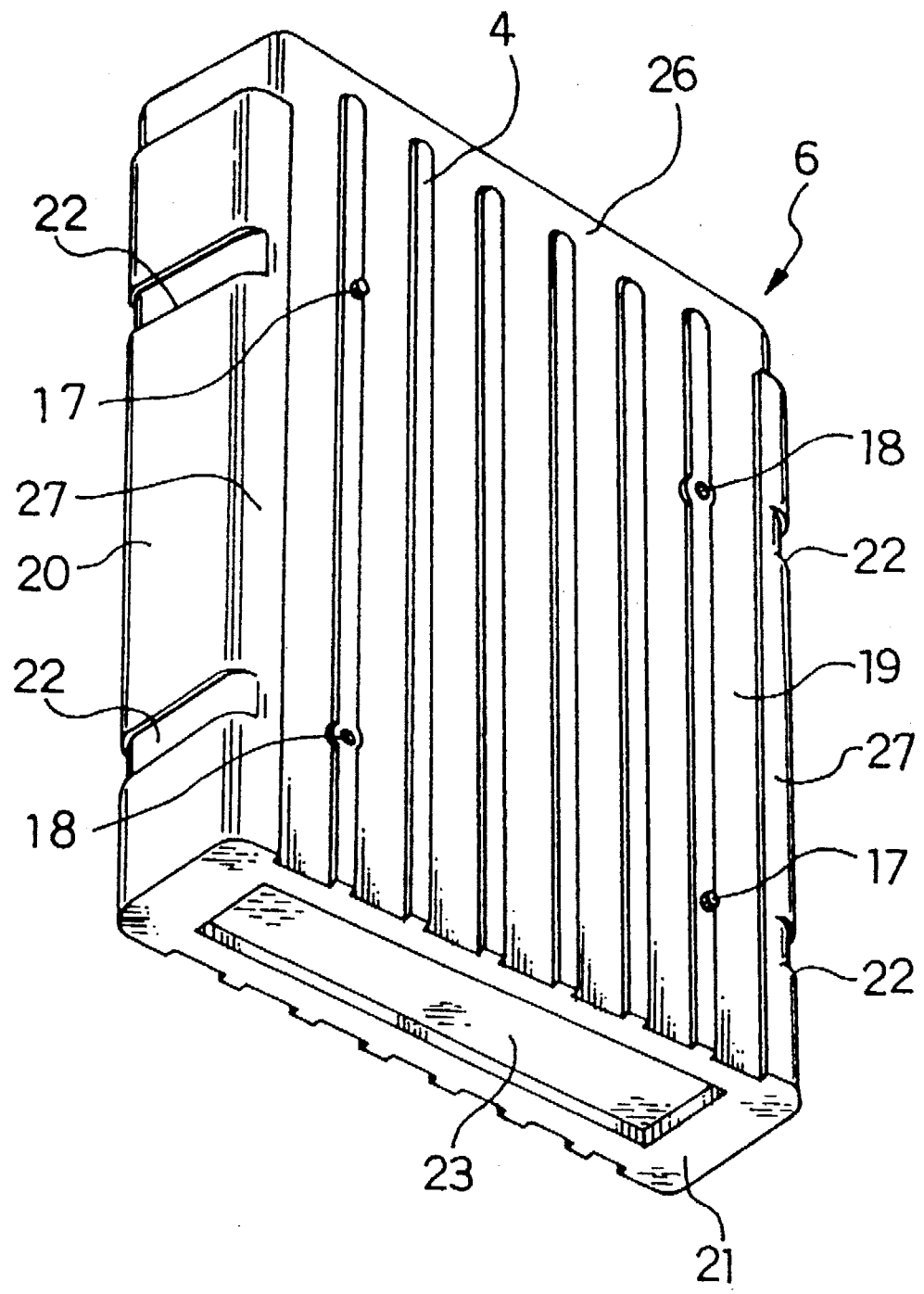
FIG. 3 is a downward perspective view of the battery casing of FIG. 2.

FIG. 1 shows a partially-cutaway perspective view of a cell 6 as a sealed storage battery. FIG. 2 and FIG. 3 show an upward and a downward perspective views of a battery casing 3 of the cell 6. FIG. 4A shows a partially-cutaway side elevation view of the cell 6. FIG. 4B shows an enlarged sectional view of the battery casing 3 and a lid 2 of the cell 6.

As shown in FIG. 1, the cell 6 comprises an electrode group 7 and an electrolyte, which are accommodated by the rectangular battery casing 3 of synthetic resin, such as polypropylene. The electrode group 7 comprises positive electrode plates and negative electrode plates, which are piled alternately through separators in the battery casing 3 sealed by the lid 2 of the same synthetic resin as of the battery casing 3. The lid 2 is thermally welded to an upper opening of the battery casing 3 accommodating the electrode group 7 and the electrolyte. A positive terminal 10 and a negative terminal 9, which are made of nickel-plated iron, are fixed to the lid 2 having a safety vent 8. The negative terminal 9 at the lower end thereof is connected to lead members 16 of the negative electrode plates of the electrode group 7. The upper portion of the negative terminal 9 is mounted on the lid 2 in both liquid-tight and air-tightness conditions. The lower end of the positive electrode terminal 10 is connected to lead members (not shown) of the positive electrode plates of the electrode group 7.

As shown in FIGS. 2 and 3, the rectangular battery casing 3 includes wider side walls 19, 19 located in parallel with the stacking direction of the positive electrode plates and the negative electrode plates, narrower side walls 20, 20 and a bottom wall 21. A plurality of ribs 4 for placing the cells 6 in butted relation with each other are longitudinally arranged in parallel each other on the outer surface of the wider side wall 19. And, two recesses 22 for positioning binding members, which will be described later, are arranged on the outer surface of the narrower side walls 20, respectively. Both end ribs 4 have a protrusion 17 and a recess 18 in reversed positions for positioning the ribs in butted relation of the cells.

The battery casing 3 has an upper portion, on which the ribs 4 are not formed, for using as a welding regions. As shown in FIG. 1, the narrower side wall 20 of the battery casing 3 is thicker than the wider side wall 19, and continuously formed with ribs 27 on the outer side of the end ribs 4. The lid 2 has a similar configuration to the battery casing 3. The outer surface of the bottom wall 21 of the battery casing 3 has a recess 23 at the central portion thereof, as shown in FIG. 3.

The lid 2 has a plurality of ribs 25 arranged similar to the ribs 4 on the outer surface of the wider side wall 19 of the battery casing 3.

In FIG. 1, the welded portion between the lid 2 and the battery casing 3 is designated by numeral 5. A protruded portion 1 is made on the welded portion 5 by molten resin in a heating step of a welding process. The protruded portion 1 is removed in a subsequent removing step by grinding. And, the ground portion is pressed by a heated metal plate to form a smooth and a flat face at the welded portion 5 in a smoothing step after the removing step in the welding process, which will be described later in a first example.

Figure 5:
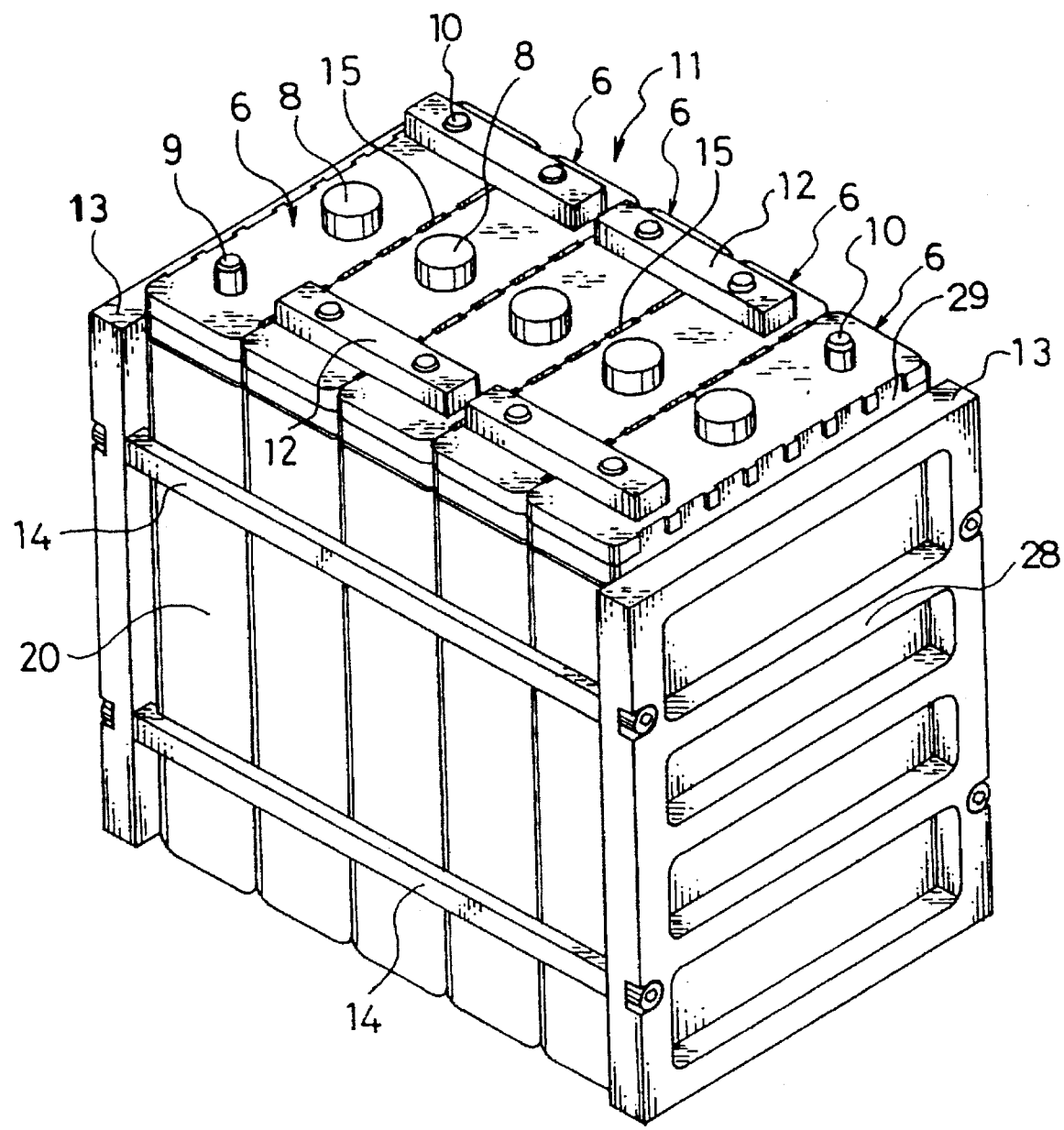
FIG. 5 is a perspective view showing a module battery using the sealed storage battery of the present invention.

FIG. 5 shows a module battery 11 having five stacked cells 6 electrically connected in series. The ribs 4 of the battery casing 3 of adjacent or opposing cells 6 are butted with each other, and the protrusions 17 formed on the ribs 4 of one of the cells 6 is fitted to the recesses 18 of the rib 4 of the other cell 6 for securing relative positions. Further, the positive and negative terminals 10 and 9 of adjacent cells 6 are connected by means of connecting conductors 12 as shown in FIG. 5.

The stacked assembly of the five cells 6 connected in series in the above-mentioned manner are configured by attaching aluminum end plates 13, 13 to both ends thereof. These end plates 13, 13 are coupled by four prismatic binding members 14, thereby tightly binding the cells to each other to prevent from separating even at increase of internal pressure of the cells or expansion of the electrode group 7. Each end plate 13 has reinforcing ribs 28. The dimensions of the end plate 13 and the binding member 14 are determined taking account of the expansion force of the electrode group 7, the internal pressure of the cell 6 and the number of stacked cells 6.

In the above-mentioned stacked assembly as a module battery, spaces 15 are formed between the ribs 4, and spaces 29 having a depth corresponding to the height of the ribs 4 are formed also between the end cells 6 and the end plates 13.

EXAMPLE 1

Next, a first example of the sealed storage battery in accordance with the present invention is elucidated with reference to the accompanying drawings.

The electrode group 7 in the battery casing 3 comprises a positive electrode plate containing nickel hydroxide powder as a main component, a negative electrode plate containing hydrogen storage alloy, and a separator.

The electrode group 7 of the first example was prepared by the following steps:

In a first step, an electrode mixture was prepared by mixing nickel hydroxide powder as an electroactive substrate and metal cobalt powder in proportion of 92:8. Next, the prepared electrode mixture was filled in pores of a porous substrate made of formed nickel. This substrate was then pressed by a pressing roller and cut to a predetermined size (10 cm×10 cm×0.07 cm), thereby preparing a nickel positive electrode plate having a capacity of 10 Ah per one plate.

And, a negative electrode plate made of a hydrogen storage alloy was prepared as follows. A powder of the hydrogen storage alloy having a composition represented by the formula:

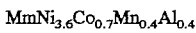

$MmNi_{3.6}Co_{0.7}Mn_{0.4}Al_{0.4}$ (Mm: misch metal) was applied to a punched metal together with a binder. The punched metal had been prepared by a nickel-plated iron plate. The punched metal coated by the hydrogen storage alloy was pressed by a pressing roller and cut to a predetermined size (10 cm×10 cm×0.05 cm), thereby preparing the hydrogen storage alloy negative electrode having a capacity of 13 Ah per one plate.

Each of these positive and negative electrode plates was encased in a bag-shaped separator. The electrode group 7 was configured by alternately piling ten pieces of the positive electrode plates and eleven pieces of the negative electrode plates. The electrode group 7 was configured to have a thickness of 93–99% of the inside width of the narrower side inner-wall of the battery casing 3.

The positive and negative electrode plates of the electrode group 7 were connected together to the positive and negative terminals 10 and 9, respectively, of nickel-plated copper, and inserted into the battery casing 3 of polypropylene. The battery casing 3 was formed by a known injection molding method, and had six ribs 4 having a height of 1.5 mm from a surface 3a of the wider side walls 19 of the battery casing 3. These ribs 4 are formed continuously along the longitudinal direction of the battery casing 3 to be parallel each other.

Next, 180 cm$^3$ of a potassium hydroxide electrolyte having a specific gravity of 1.26 was injected through an opening of the battery casing 3 having contained the electrode group 7 therein. Then, the opening of the battery casing 3 was sealed by bonding thereto the polypropylene lid 2 having the safety vent 8 set to operate at an internal pressure of 3–4 kg/cm$^2$, by the following welding process.

Figure 6:
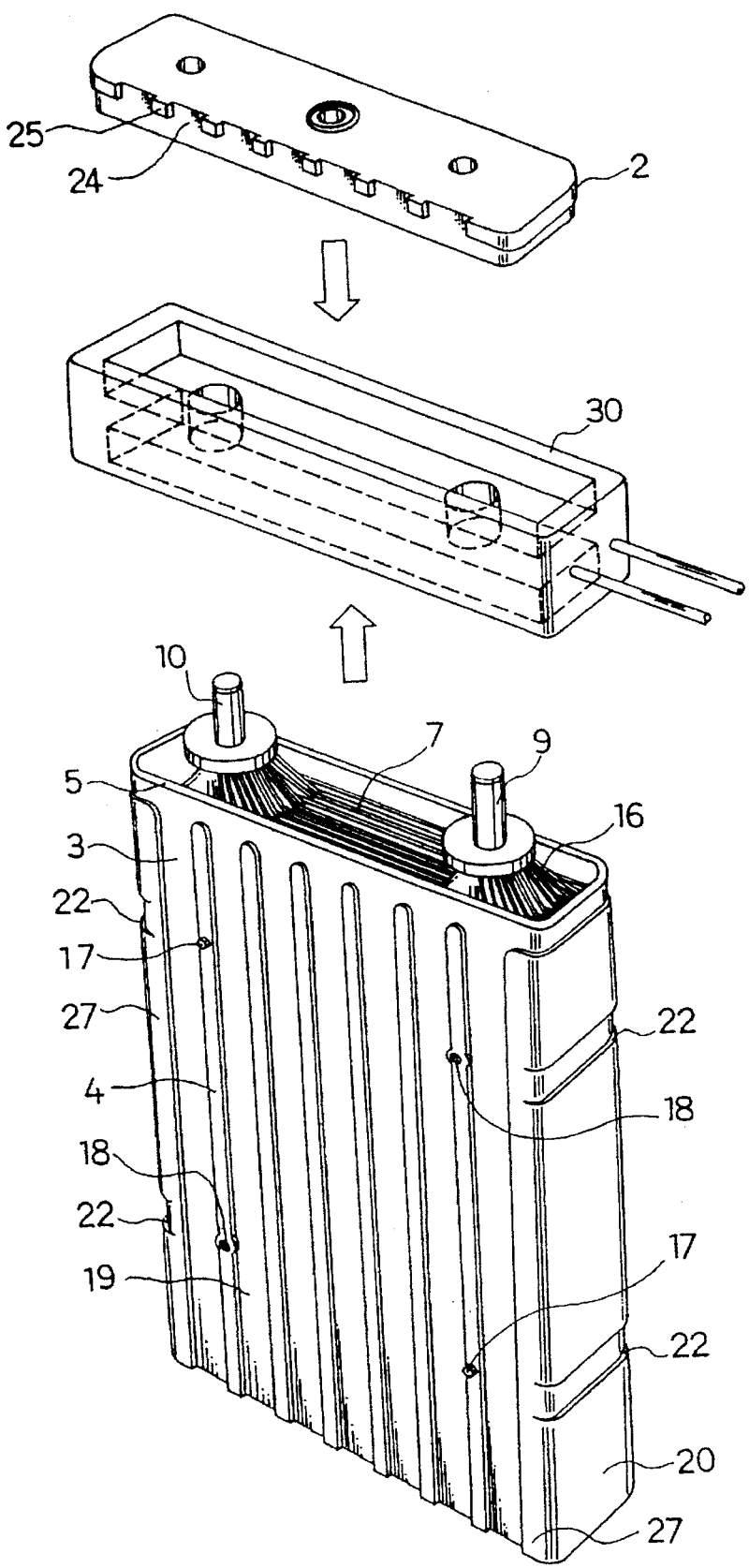
FIG. 6 is a perspective view showing a heating step in a welding process for manufacturing the sealed storage battery.
Figure 7:
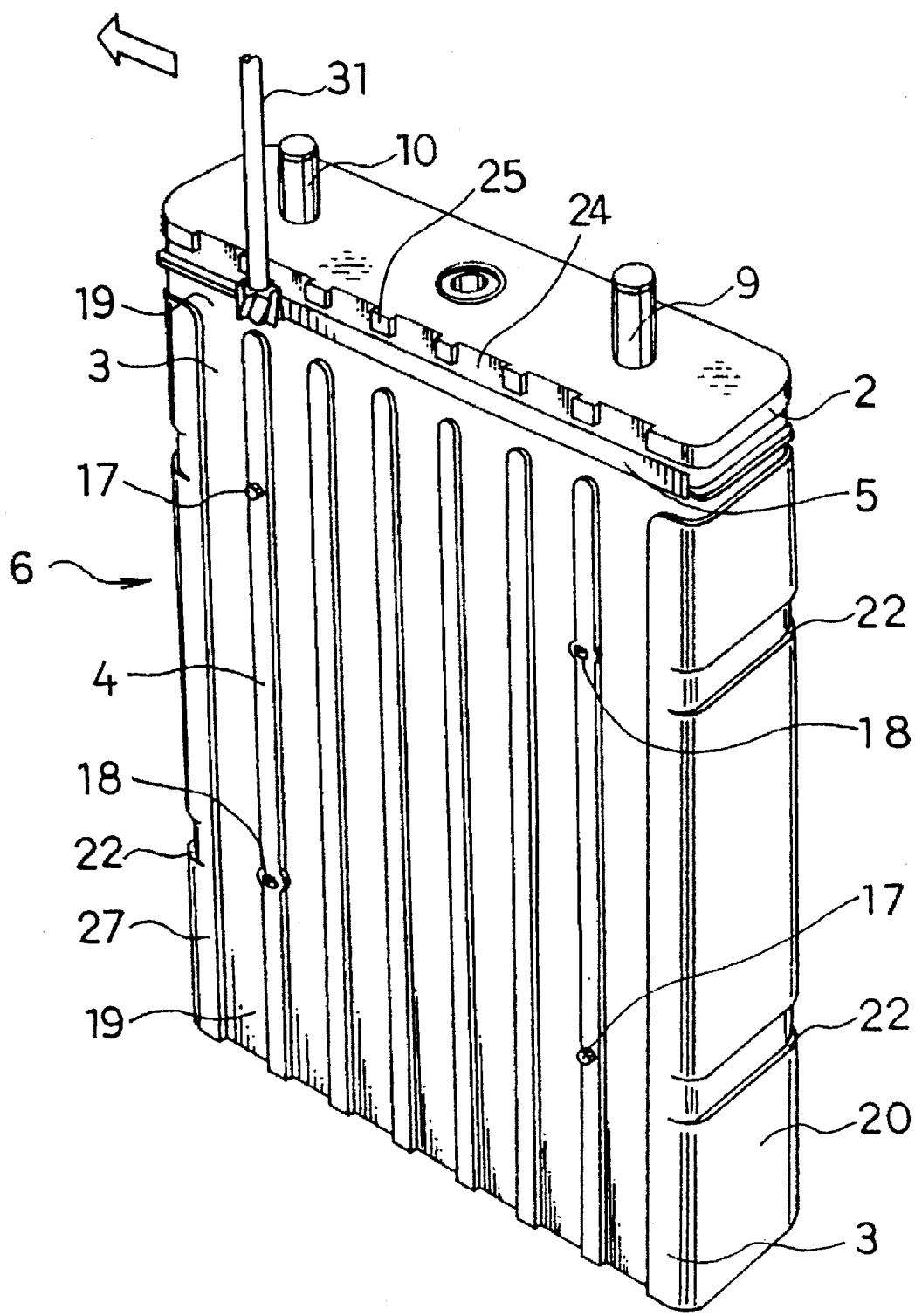
FIG. 7 is a perspective view showing a removing step in the welding process.
Figure 8:
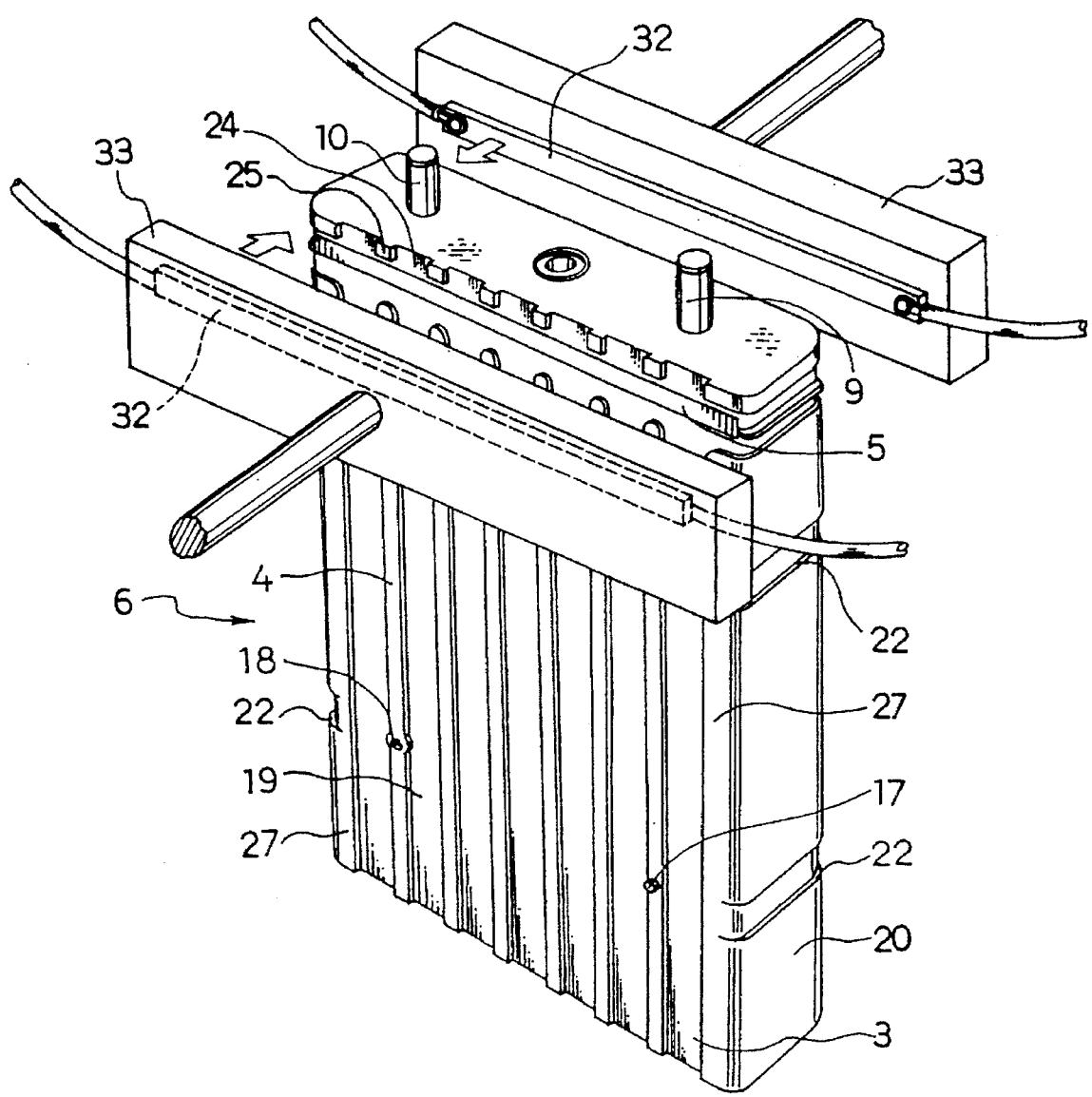
FIG. 8 is a perspective view showing a smoothing step in the welding process.

FIG. 6 is a perspective view showing a heating step in the welding process for connecting the lid 2 to the battery casing 3, FIG. 7 is a perspective view showing a removing step in the welding process, and FIG. 8 is a perspective view showing a smoothing step in the welding process.

As shown in FIG. 6, in the heating step of the welding process, end faces to be connected in the battery casing 3 and the lid 2 were contacted by a heating metal plate 30 kept at a temperature in the range of between 240° C. to 260° C., for a time of 10 sec. to 15 sec. In the contacting, the depth of mutual molten portions of the battery casing 3 and the lid 2 becomes 0.3 mm to 0.8 mm. The heating metal plate 30 had a heater therein and was coated by a fluororesin, such as polytetrafluoroethylene, to prevent from sticking to the synthetic resin battery casing 3 and lid 2 in the heating step of the welding process. In this heating step, the heating metal plate 30 was sandwiched between the battery casing 3 and the lid 2 as shown in FIG. 6. The heating metal plate 30 has an upper recess and a lower recess for preventing needless heating. After the heating step, the heating metal plate 30 was removed from the position between the battery casing 2 and the lid 2. And, the molten portions of the battery casing 3 and the lid 2 are connected by pressing with cooling. As a result of the pressing step, protruded portions 1 were generated in the welded portion 5 of the outer wall and the inner wall of the battery casing 3 and the lid 2. The height (in the horizontal direction) of the protruded portions 1 is about 1.0 mm from the surface 3a or 2a of the battery casing 3 or the lid 2.

Next, the protruded portions 1, which were generated on the outer welded portion 5 of the wider side walls 19, were removed by an end mill 31 in the removing step as shown in FIG. 7.

Next, in the smoothing step as shown in FIG. 8, the ground portions of the outer welded portion 5 was pressed by metal plates 32 heated at a temperature in the range of 240° C. to 260° C. by heaters, so as to smooth and flatten the ground portion on the outer welded portion 5 of the wider side walls 19. The metal plates 32 are supported by hard resin supporters 33, which are connected to cylinder rods, respectively.

In the removing step, if the protruded portions 1 of the outer welded portion 5 can not be removed completely by the end mill 31, the protruded portions 1 should be removed so that the protruded part has a height lower than of the ribs 4.

The cell 6 as a component of the sealed storage battery in accordance with the present invention was prepared by the above-mentioned method, and the cell 6 thus made had the smoothed outer welded portion 5 between the battery casing 3 and the lid 2. While the inner welded portion had protruded portions in the welded regions, the outer welded portion 5 was formed to have smooth and flat surface as shown in FIG. 4B.

The following three cells were prepared as comparative examples:

Comparative Example 1

A cell of the comparative example 1 was prepared to have protruded portions at the outer welded portion and the inner welded portion of the battery casing and the lid. This cell was configured by the same manner as that in the aforementioned first example except that the protruded portion on the outer welded portion was not removed.

Comparative Example 2

A cell of the comparative example 2 was prepared to have ribs having a height of 2.5 mm. And, this cell was prepared by the same manner as that in the aforementioned first example except that the protruded portion on the outer welded portion was not removed.

Comparative Example 3

A cell of the comparative example 3 was prepared by welding between the battery casing and the lid under the condition that the battery casing and the lid were welded not to protrude externally in the pressing step of the welding process. The other steps for preparing this cell of the comparative example 3 were performed by the same method as that in the aforementioned first example.

The cell 6 of the first example in accordance with the present invention and the cells of the comparative examples 1, 2 and 3 were subjected to a tensile strength test and an air-tightness test of the welded portion between the battery casing and the lid. These test results are shown in Table 1. The air-tightness tests for the first example and the comparative examples were conducted by using a helium leak detector for measuring the leakage of helium as a detected medium. The air-tightness was measures by using the helium leak detector type "DLMS-TP3" manufactured by ULVAC JAPAN LTD. In the air-tightness test, when the helium gas was sprayed on the outer welded portion of the sealed battery casing and lid to be inspected, the leakage helium per unit of time within the sealed battery casing and lid was measured by the helium leak detector. The data of the air-tightness shown in Table 1 are expressed with the helium leak rate [Torr·l/s, 1.0 Torr·l/s≈$1.333 \times 10^{-1}$ Pa·M$^3$/s] measured by the helium leak detector.

In these tests, four kinds of module batteries were configured by using the stacked cells of the first example and the comparative examples 1, 2 and 3. Each module battery was configured by connecting five cells in series (output voltage of the module battery was 6 V), as shown in FIG. 5. Each module battery of the first example and the comparative examples 1, 2 and 3 were subjected to an internal temperature test of the module battery after charging, a discharge capacity test, and a test of an energy density per unit volume of the module battery. These test results are shown in Table 2. The discharge capacity test was conducted by measuring a discharge time-interval until the battery voltage decreased to 5 V at a current of 20 A after completion of 14 hours charging of the module battery with a current of 10 A on the environmental temperature of 25° C. In the charging operation, the gaps or spaces between the cells were exposed to air-flow supplied from under the module battery by means of a fan. The fan was operated so that an average velocity of air passing through the spaces was 3.0 m/sec. The internal temperature test of the module batteries was conducted by using a thermocouple, which was inserted to a center cell of the module battery. The energy density per unit volume was measured by dividing the discharge capacity by the volume of the module battery.

TABLE 1

|  | Example 1 | Comparative example 1 | Comparative example 2 | Comparative example 3 |
| --- | --- | --- | --- | --- |
| Tensile strength (kgf/cm$^2$) | 290 | 300 | 300 | 180 |
| Air-tightness (Torr · l/s) | $8 \times 10^{-9}$ | $3 \times 10^{-9}$ | $3 \times 10^{-9}$ | $5 \times 10^{-6}$ |

TABLE 2

|  | Example 1 | Comparative example 1 | Comparative example 2 | Comparative example 3 |
| --- | --- | --- | --- | --- |
| Discharge capacity (Ah) | 124 | 104 | 124 | 124 |
| Energy density (wh/l) | 170 | 142 | 160 | 170 |
| Internal temperature (°C.) | 32 | 58 | 34 | 32 |

As is obvious in Table 1, the cell 6 of the first example in accordance with the present invention had a tensile strength of 290 kgf/cm$^2$ at a welded portion 5 between the battery case 3 and the lid 2, and possessed superior performance as well as a tensile strength of a polypropylene. As shown in Table 1, the tensile strength of the cell 6 of the present invention stands comparison with the cells of the comparative examples 1 and 2 in which protruded portions were formed on an inner welded portion and an outer welded portion. According to our experience, when a cell had a tensile strength of 250 kgf/cm$^2$ or more, the cell can withstand the changes of the expansion and the construction owing to the increased internal pressure of the cell or the repetitive charging and discharging period. Therefore, the cell of the present invention has an improved long-term reliability.

In contrast, the cell of the comparative example 3, in which a welded portion between the battery casing and the lid was connected without forming protruded portion, has a tensile strength of 180 kgf/cm$^2$ as shown in Table 1. When the internal pressure of the cell of the. comparative example 3 reached 4 kg/cm² after charging, a part of the welded portion between the battery casing and the lid were cracked, thereby causing leakage of oxygen gas and hydrogen gas from the inside of the cell. It is apparent from Table 2 that the cell of the comparative example 3, in which the welded portion was connected without forming protruded portion, is inferior to the first example of the present invention in safety and reliability.

As shown in Table 1, the cell 6 of the first example of the present invention had an air-tightness performance of $8 \times 10^{-9}$ Torr·l/s. The cell 6 of the first example showed superior performance to the cell of the comparative examples 1 and 2 in which the protruded portions are formed on the outer welded portions of the battery casing etc. Such superior performance are obtained by performing the flowing step in the welding process. After removing the protruded portion on the outer welded portion 5 by the end mill 31, the ground portion of the outer welded portion 5 was pressed by the heating metal plate 32 kept at a temperature in the range of 240° C. to 260° C. so as to smooth and flat the welded portion 5. As a result, gaps leaking gas in the welded portion was sealed by the smoothing step entirely. Since this smoothing step was conducted in the welding process for manufacturing the sealed storage battery of the present invention, the sealed storage battery of the present invention remarkably improves the air-tightness in the welded portion 5. According to our experiments, the above-mentioned smoothing step can be conducted by the heating metal plate 32 kept at a temperature in the range of 200° C. to 400° C.

When the air-tightness of the welded portion between the battery casing and the lid reached $1.0 \times 10^{-8}$ Torr·l/s or more in the storage period, oxygen gas and/or hydrogen gas were released from the cell. Therefore, the cell of the comparative example 3 had problems in safety, considerable self-discharge, and reduced discharge capacity after the storage period.

The cell of the comparative example 3, in which a welded portion was connected without forming protruded portion, had an air-tightness of $5 \times 10^{-6}$ Torr·l/s, and was apt to leak helium gas from the welded portion in comparison with the cell of the present invention. In our experiment, when the cell of the comparative example 3 was preserved in the charged condition, it was observed that hydrogen gas leaked from the welded portion between the battery casing and the lid.

As seen from Table 2 showing properties of the module batteries, the module battery of the first example, which was prepared by stacking cells of the present invention, had a discharge capacity of 124 Ah, which is as high as 95% of the theoretical capacity of the positive electrode plate. As a result, the cell of the first example had a superior energy density per unit volume of 170 Wh/l.

As shown in Table 2, the internal temperature of the center cell, which had most increased temperature in the module battery, was 34° C. at the end of the charging period, and rose at only 9° C. above the environmental temperature.

As shown in FIG. 5, the spaces 15 were formed by stacking the cells 6 with their the ribs 4 of 1.5 mm height on the face of the battery casing 3 abutting to each other, which were securely held by the end plates 13 coupled by the binding members 14. And the spaces 29 having a depth defined by the height of the rib 4 were formed also between the end cell 6 and the end plate 13. Since the protruded portion was removed from the outer welded portion 5 between the battery casing 3 and the lid 2, these spaces 15 and 29 were continuously arranged along the longitudinal direction of the battery casing 3 and the lid 2. A cooling medium, such as air, flew through the spaces 15 and 29, at a velocity of 3 m/s. Thereby the heat generated in the cell is removed and undesirable temperature rise in the cell is prevented. As a result, the module battery using the cells of the present invention had an internal temperature of 34° C. even in the end of the charging period, and possessed superior characteristics in a discharge capacity and an energy density.

In contrast with the present invention, a comparative module battery, which was prepared by stacking cells of the comparative example 1 having the protruded portion on the outer welded portion, had poor performances in comparison with the above-mentioned module battery having the cells in accordance with the present invention, as shown in Table 2. The module battery in accordance with to the comparative example 1 had a discharge capacity of 104 Ah, an energy density per unit volume of 142 Wh/l, and an internal temperature of 58° C. This is for the reason that the spaces for allowing air to flow are not formed to have the same depth as the spaces 15, 29 formed by the butted ribs 4 of the cell 6 of the present invention because the protruded portion was not removed from the outer welded portion. Therefore, it is so hard for the module battery in accordance with the comparative example 1 to flow the air between the cells in an upward direction even if the air was supplied to spaces between the cells from the lower side of the module battery by means of a fan.

As a result, the heat dissipation of the module battery in accordance with the comparative example 1 was lowered, whereby the internal temperature of this module battery was increased. And, the charging efficiency of the positive electrode of each cell was largely impaired. And as shown in Table 2, the discharge capacity and the energy density of the module battery in accordance with the comparative example 1 were inferior to the module battery in accordance with the present invention.

The module battery prepared by stacking the cells of the comparative example 2 has the ribs taller than of the cell in accordance with the present invention by 1 mm. Therefore, the air flows smoothly in the spaces between the cells in an upward direction, and the heat generated in the cells can be dissipated by the air flow passing through the spaces. However, the module battery of the comparative example 2 had an undesirable performance that the energy density per unit volume was lowered because of a large configuration.

As shown in Table 2, the module battery of the comparative example 3 had the same performances as the module battery in accordance with the present invention. However, when the internal pressure of the cell of the comparative example 3 reached 4 kg/cm² at the end of the charging period, a part of the welded portion between the battery casing and the lid was cracked, and oxygen gas and hydrogen gas were discharged from the cells. Therefore, the cell of the comparative example 3, in which a welded portion was connected without forming a protruded portion, is inferior to the cell 6 of the present invention in a safety and a reliability.

In the first example in accordance with the present invention, the protruded portion had a height of about 1.0 mm from the surface of the outer wall of the battery casing and the lid. According to our experience, an appropriate protruded portion had a height of 0.5 mm to 2 mm.

When the height of a protruded portion of cell is less than 0.5 mm, such cell possessed poor performance in a tensile strength and an air-tightness, and is inferior to a reliability and a safety.

When the height of a protruded portion of cell is over than 2 mm, it is very hard to connect a battery casing to a lid by welding with high accuracy, and a deviation is apt to generate at the welded portion between the battery casing and the lid. As a result, it is very hard to manufacture such cell having protruded portion height of over than 2 mm and obtains accurate outer dimensions after welding. Therefore, such cell was undesirable for manufactured products.

According to our experience, an appropriate rib height is from 1 mm to 2 mm. When the cell has a rib height of less than 1 mm, the air as a cooling medium hardly flew through the spaces between the cells, thereby causing rise of the internal temperature, and thereby decreasing the discharge capacity. When the cell has a rib height of over than 2 mm, such cell is undesirable for use because the energy density per unit volume was decreased as shown by the comparative example 2 in Table 2.

Apart from the preferred embodiment in accordance with the present invention wherein the battery casing of the cell has ribs 4 for forming air-flow spaces on the outer surface thereof, a modified embodiment may be such that a module battery has stacked cells having flat battery casings, which are arranged to have spaces between them by disposing spacers between the cells. And further, another modified embodiment may be such that protruded portions corresponding to the space for allowing air to flow between the cells are removed from a outer welded portion.

Apart from the above-mentioned embodiment wherein the battery casing 3 and the lid 2 are made of polypropylene as a rigid resin, a modified embodiment may be such that acrylonitrile-butadiene-styrene (ABS), denatured polyphenylene ether, polyamide, polyphenylene sulfide (PPS) or a polymer alloy containing at least two of them. Though these resins are melted at a different temperature, according to our experience, an appropriate temperature for melting resin is from 250° C. to 400° C.

Apart from the above-mentioned embodiment wherein the negative electrode plate is made of hydrogen storage alloy of $MmNi_5$ type, a modified embodiment may be such that a negative electrode plate is made of general hydrogen storage alloy, which is capable of absorbing and desorbing hydrogen electrochemically manner.

Apart from the above-mentioned embodiment wherein the sealed storage battery is a nickel-metal hydride storage battery, a modified embodiment may be such that a sealed storage battery is a general sealed storage battery, such as a nickel-cadmium storage batteries, a manganese dioxide secondary battery, lead storage battery or the like.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A sealed storage battery comprising a plurality of abutting cells, each cell having:

a casing including opposing substantially parallel outer side faces and an open top, each outer side face for facing an outer side face of an abutting cell, the casing being constructed from a synthetic resin;

an electrode group and an electrolyte residing within the housing;

a plurality of longitudinally extending ribs arranged substantially in parallel with each other on each outer side face of the casing, the ribs forming longitudinally extending cooling medium channels therebetween on each outer side face of the casing; and a lid constructed from a synthetic resin, the lid being sealingly welded to the top of the casing at a welding juncture at the outer side faces, the lid sealingly enclosing the electrode group and the electrolyte within the casing, the welding juncture at each outer side face being substantially flat with respect to the outer side face, whereby a cooling medium passing along the cooling medium channels on the outer side faces of the casing is substantially unrestricted at the welding juncture.

2. The sealed storage battery of claim 1 wherein the lid is thermally welded to the top of the casing.

3. The sealed storage battery of claim 1 wherein each rib extends about 1 to 2 mm away from the respective outer side face.

4. The sealed storage battery of claim 1 wherein the synthetic resin from which the casing is constructed is selected from the group consisting of polypropylene, acrylonitrile-butadiene-styrene, denatured polyphenylene ether, polyamide and polyphenylene sulfide.

5. The sealed storage battery of claim 1 wherein the synthetic resin from which the lid is constructed is selected from the group consisting of polypropylene, acrylonitrile-butadiene-styrene, denatured polyphenylene ether, polyamide and polyphenylene sulfide.

6. The sealed storage battery of claim 1 wherein the electrode group includes alternately piled positive electrode plates and negative electrode plates and separators therebetween, the outer side faces of the casing and the electrode plates each being aligned in planes substantially parallel with respect to each other, and wherein the positive electrode plates include nickel hydroxide and the negative electrode plates include a hydrogen storage alloy which electrochemically absorbs and desorbs hydrogen.

7. A method for sealing a cell in a sealed storage battery comprising a plurality of abutting cells, each cell having:

a casing including opposing substantially parallel outer side faces, an open top, and a welding region adjacent to the open top and each outer side face and surrounding the open top, each outer side face for facing an outer side face of an abutting cell, the casing being constructed from a synthetic resin that becomes deformable when heated;

an electrode group and an electrolyte residing within the housing;

a plurality of longitudinally extending ribs arranged substantially in parallel with each other on each outer side face of the casing, the ribs forming longitudinally extending cooling medium channels therebetween on each outer side face of the casing; and a lid including a perimeter and a welding region adjacent to and surrounding the perimeter, the welding region of the casing corresponding to the welding region of the lid, the lid being constructed from a synthetic resin that becomes deformable when heated;

wherein the method for sealing the cell comprises the steps of:

heating the welding region of the lid such that the lid welding region becomes deformable;

heating the welding region of the casing such that the casing welding region becomes deformable;

placing the welding region of the lid in registry with the welding region of the casing;

pressing the welding region of the lid into contact with the welding region of the casing to form a welding juncture on each outer side face of the casing and to seal the lid to the top of the casing at the welding juncture, the lid sealingly enclosing the electrode group and the electrolyte within the casing, the pressing step also forming a protrusion at the welding juncture on each outer side face extending away from the outer side face; and removing the protrusion at the welding juncture on each outer side face such that the welding juncture on each outer side face is substantially flat with respect to the outer side face, whereby a cooling medium passing along the cooling medium channels on the outer side faces is substantially unrestricted at the welding juncture.

8. The method of claim 7 wherein the protrusion at the welding juncture on each outer side face extends a distance away from the outer side face, and wherein the removing step comprises the steps of:

grinding the protrusion to reduce the distance the protrusion extends away from the outer side face; and pressing a heating plate against the welding juncture on each outer side face to level the welding juncture with respect to the outer side face.

* * * * *